US009712202B2

(12) United States Patent
Bao

(10) Patent No.: US 9,712,202 B2
(45) Date of Patent: Jul. 18, 2017

(54) MULTI-FUNCTIONAL MOBILE PHONE PROTECTION CASE AND MANUFACTURING METHOD THEREOF

(71) Applicant: Far East Tooling Co., Ltd., Shanghai (CN)

(72) Inventor: Shiyou Bao, Shanghai (CN)

(73) Assignee: FAR EAST TOOLING CO., LTD., Shanghai (CN)

( * ) Notice: Subject to any disclaimer, the term of this patent is extended or adjusted under 35 U.S.C. 154(b) by 0 days.

(21) Appl. No.: 15/158,246

(22) Filed: May 18, 2016

(65) Prior Publication Data
US 2017/0163305 A1 Jun. 8, 2017

(30) Foreign Application Priority Data

Dec. 4, 2015 (CN) .......................... 2015 1 0878296

(51) Int. Cl.
*H04B 1/38* (2015.01)
*H04B 1/3888* (2015.01)
*B29C 45/14* (2006.01)
*A45C 11/00* (2006.01)
(Continued)

(52) U.S. Cl.
CPC ............ *H04B 1/3888* (2013.01); *A45C 11/00* (2013.01); *B29C 45/14008* (2013.01); *A45C 2011/002* (2013.01); *B29L 2031/3431* (2013.01); *H04B 2001/3855* (2013.01); *H04B 2001/3894* (2013.01)

(58) Field of Classification Search
CPC .......... H04B 1/3888; H04B 2001/3894; H04B 2001/3855

USPC .... 455/575.8, 575.1, 550.1, 575.6, 90.3, 73, 455/90.1, 90.2, 566, 422.1, 403; 361/679.01; 379/433.01, 437, 441, 451
See application file for complete search history.

(56) References Cited

U.S. PATENT DOCUMENTS

2014/0262848 A1* 9/2014 Fathollahi .............. A45C 11/00
206/37

* cited by examiner

*Primary Examiner* — Keith Ferguson
(74) *Attorney, Agent, or Firm* — Marger Johnson

(57) ABSTRACT

The present invention discloses a multi-functional mobile phone protection case and a manufacturing method thereof. The multi-functional mobile phone protection case comprises an upper cover, a main case, a screen rubber coating and a back case; the upper cover is installed on top of the main case through a pin; volume keys are provided at the upper left side of the main case; and a mobile phone fixing pad and a rope are provided from top to bottom of the lower left side of the main case, respectively; and a power key, a padlock and a fixing button are provided from top to bottom of the right side of the main case, respectively; back case is installed on rear side of the main case through a bracket locking mechanism; an arm band buckle is fixed to rear side of the back case through a second arm band fixing clip and a first arm band fixing clip, a fabric band is provided on the front end of the arm band buckle; a waterproof earphone plug and a waterproof acoustic transmission film is set up from left to right of the bottom of the upper cover, respectively. Through unique structure and manufacturing process design, the present invention can achieve integration of multiple functions, simple and sensible structure design, and not only waterproof, anti-collision and anti-freezing functions, but also sports adaption, portability and multi-style compatibility.

4 Claims, 5 Drawing Sheets

(51) Int. Cl.
*B29L 31/34* (2006.01)
*H04B 1/3827* (2015.01)

MULTI-FUNCTIONAL MOBILE PHONE PROTECTION CASE AND MANUFACTURING METHOD THEREOF

CROSS-REFERENCE TO RELATED APPLICATION

This application claims priority to foreign Chinese patent application No. CN 201510878296.1, filed on Dec. 4, 2015, the disclosure of which is incorporated by reference in its entirety.

TECHNICAL FIELD

The present invention relates to the technical field of mobile phone accessories, specifically to a multi-functional mobile phone protection case and a manufacturing method thereof.

BACKGROUND

Mobile phone cases are a kind of mobile phone accessories most commonly used by mobile phone users. A mobile phone case wraps around the outside of a mobile phone to reduce wear and tear of the mobile phone. As an auxiliary product of mobile phones, mobile phone cases with various functions are available as mobile phones progress. Many existing mobile phone cases cover outside surfaces of mobile phones. The rear panel of mobile phone cases is provided with different patterns as a kind of individual mobile phone decoration. People usually exchange different appearances upon usage environment and feeling of freshness. However, such mobile phone cases have no other function except cosmetic appearances.

In addition, mobile phone cases available on the market have various functions. Some are waterproof; some are collision proof; and some provide protection against hot and cold temperatures. However, no mobile phone case integrates those features yet, and none is able to adapt to different types of mobile phone supports.

SUMMARY

The objective of the present invention is to provide a multi-functional mobile phone protection case with simple structure and ease of use and a manufacturing method thereof, to solve the issues in the prior art.

To fulfill the above objective, the present invention provides the following technical solution.

A multi-functional mobile phone protection case, comprises an upper cover, a main case, a screen rubber coating and a back case; the upper cover is installed on top of the main case through pins; a fingerprint identification waterproof transparent film is installed inside of the screen rubber coating; volume keys are set up on the upper left side of the main case; a mobile phone fixing pad and a rope are set up on the lower left side of the main case, respectively; a power key, a padlock and a locking button are set up from top to bottom of the right side of the main case; the back case is installed on the rear side of the main case through a bracket locking mechanism; trademark anti-scratch transparent film and a glass lens cover are on the main case above the back case; an arm band buckle is fixed to the rear of the back case through a second arm band fixing clip and a first arm band fixing clip; a fabric band is set up on the end of the arm band buckle; and a waterproof earphone plug and a waterproof acoustic transmission film are at the bottom of the upper cover.

As a further solution of the present invention, the threads of the waterproof earphone plug lock a seal through a sealing ring.

A manufacturing method of the multi-functional mobile phone protection case includes the following steps:

1) Perform injection molding of the upper cover and the main case first;
2) Perform injection molding of the rubber coatings of the volume keys and the power key after the injection molding of the upper cover and the main case is completed;
3) Past the fingerprint identification waterproof transparent film;
4) Manually insert the main case into a slide block of a rubber coating mold, wherein an oil cylinder of the slide block quickly closes the mold of the slide block with the main case;
5) Close front mold panel and rear mold auxiliary panel, then mold injection machine starts to work, and fills rubber into a product via a rubber inlet;
6) After the product injection molding is completed, opening the mold, peel off three-plate mold head, wherein plate A and plate B open; then, the oil cylinder of the slide block pulls the slide block away while a rear mold locating insert blocks the product; after the slide block is separated from the product, the rear mold locating insert moves back; the slide block opens completely; at this time, the product is pushed upward along a slide block guide slot of the slide block; the product is taken out;
7) Perform injection molding and processing of the parts and accessories; and,
8) Assemble all parts to obtain the product.

As a further solution of the present invention, a flow plate is disposed between the front mold panel and plate A.

Compared to the prior art, the present invention has the following advantages: Through unique structure and process design, the present invention can achieve integration of multiple functions, simple and sensible structure design. It not only features waterproof, collision proof, and anti-freezing functions, but also adaption of different types of sports, portability and multi-style compatibility. This product can be adapted to different types of mobile phone supports, and has a broad market prospect.

DETAILED DESCRIPTION OF THE PRESENT INVENTION

The technical solution of the present invention is described in further detail with reference to the embodiments as follow.

Figure 1:
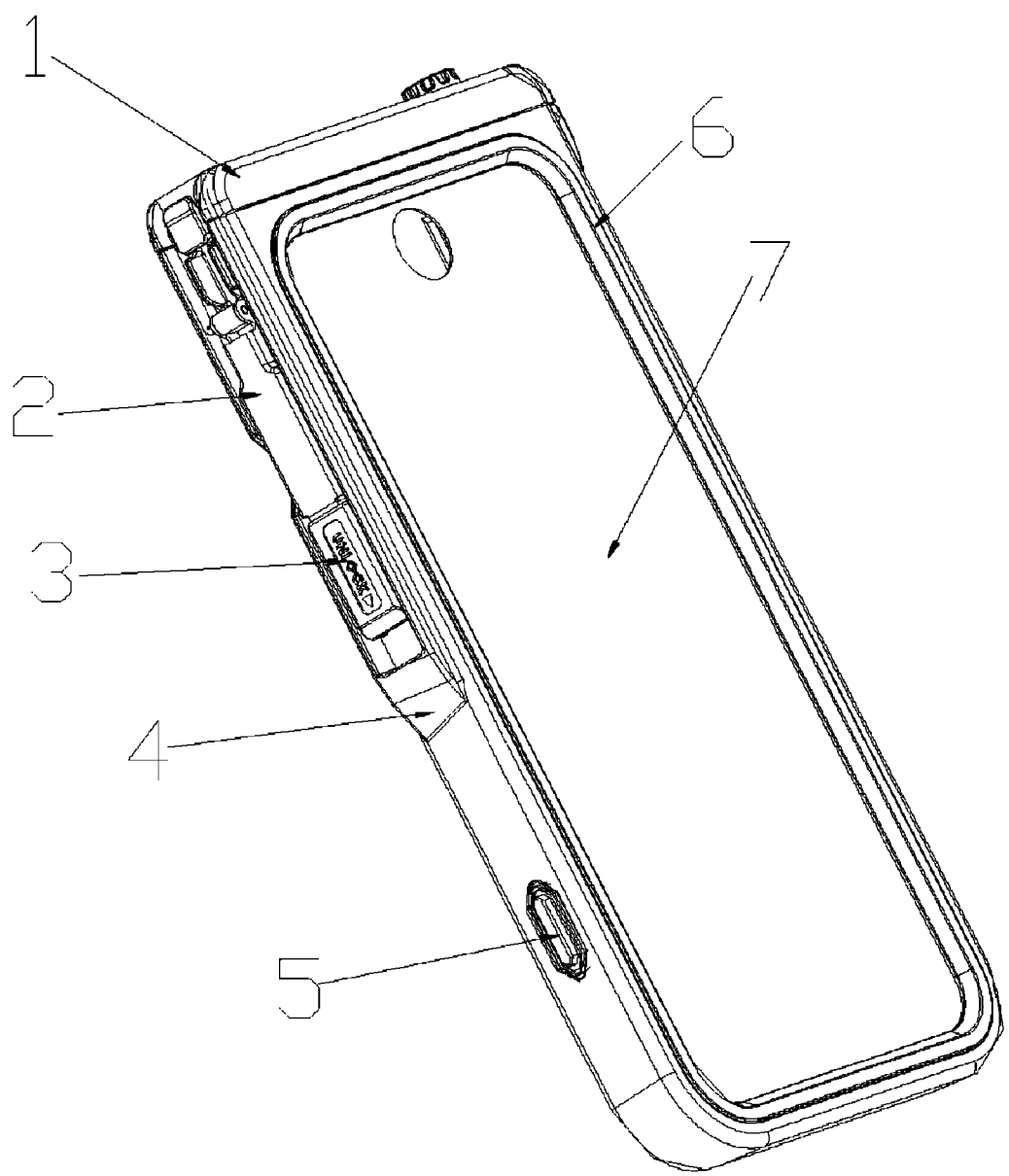
FIG. 1 is the illustrative structural diagram of the present invention.
Figure 2:
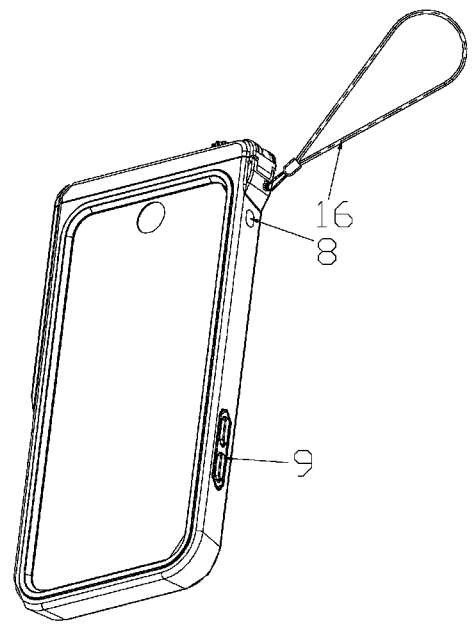
FIG. 2 is the illustrative structural diagram of the present invention.
Figure 3:
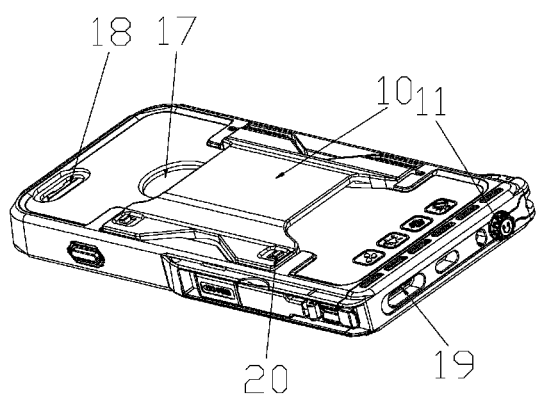
FIG. 3 is the illustrative structural diagram of the present invention.
Figure 4:
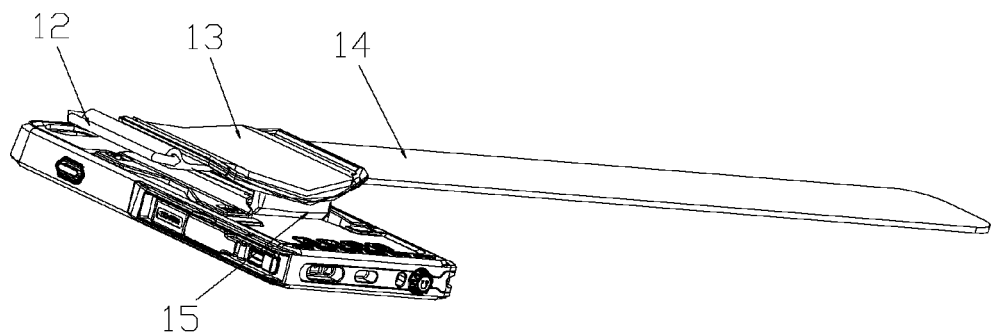
FIG. 4 is the illustrative structural diagram of the present invention.
Figure 5:
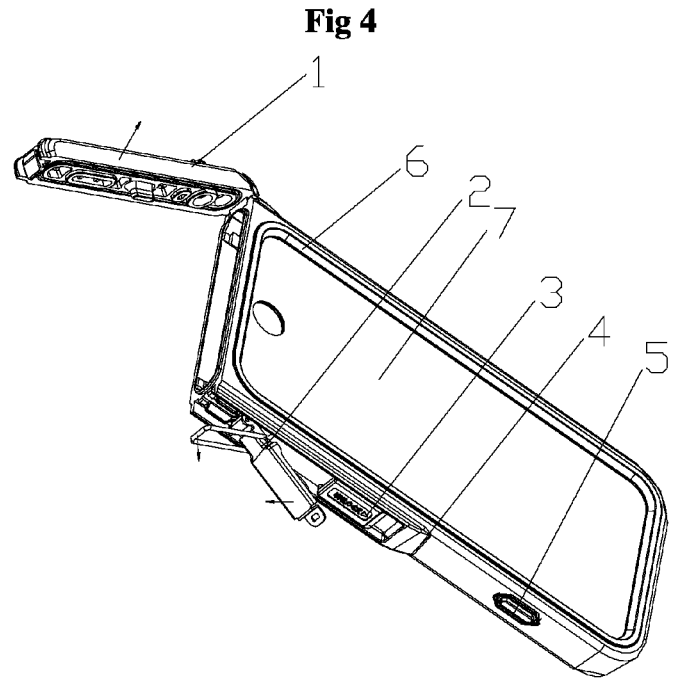
FIG. 5 is the illustrative structural diagram of the present invention, wherein the upper cover is open.
Figure 6:
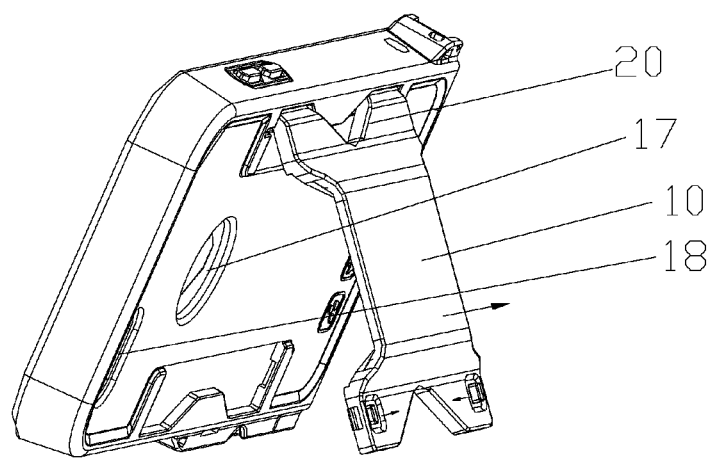
FIG. 6 is the illustrative structural diagram of the present invention, wherein the back case is open.
Figure 7:
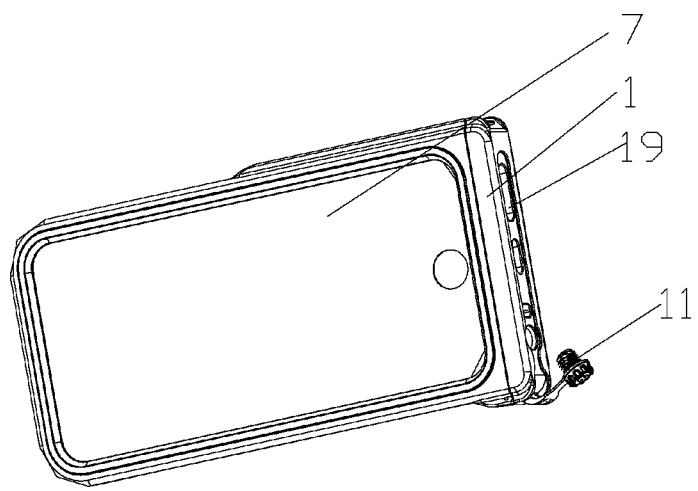
FIG. 7 is the illustrative structural diagram of the present invention, wherein the waterproof plug is open.
Figure 8:
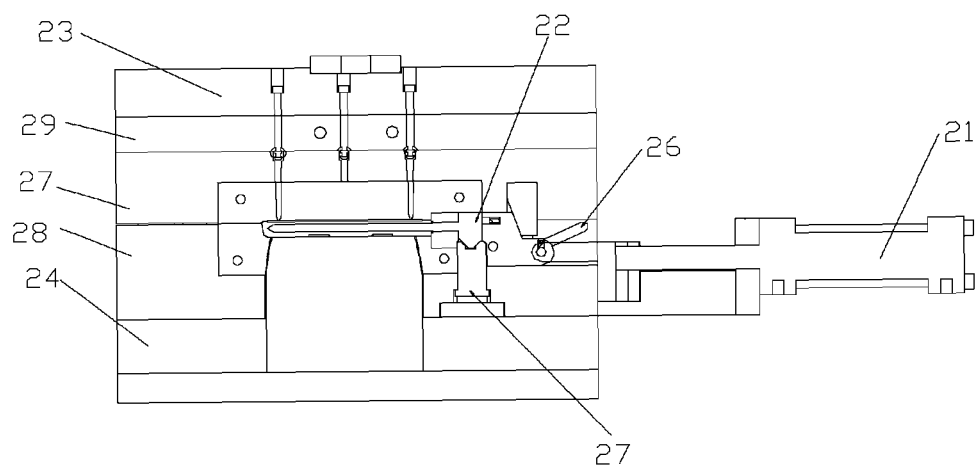
FIG. 8 is the illustrative structural diagram of a rubber coating mold of the present invention.
Figure 9:
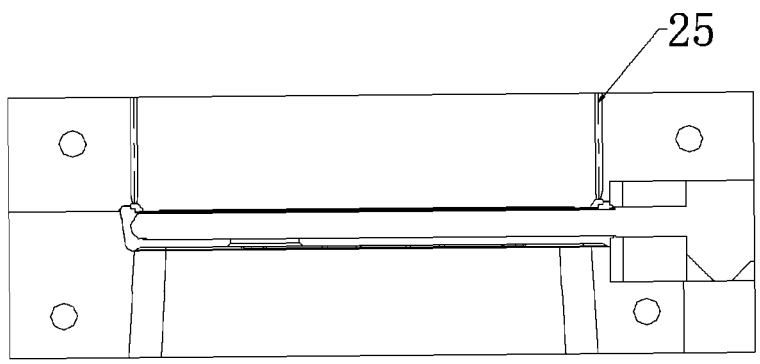
FIG. 9 is the schematic diagram of the rubber inlet location of the rubber-coating mold of the present invention.

Refer to FIG. 1-9. A multi-functional mobile phone protection case, comprising an upper cover 1, a main case 4, a screen rubber coating 6 and a back case 10; the upper cover 1 is installed on top of the main case 4 through pins; a fingerprint identification waterproof transparent film 7 is installed inside of the screen rubber coating 6; volume keys 9 are set up at the upper left side of main case 4; a mobile phone fixing pad 8 and a rope 16 are set up at the lower left side of main case 4, respectively; a power key 5, a padlock 3 and a locking button 2 are set up from top to bottom of the left side of main case 4, respectively; back case 10 is installed on the rear side of main case 4 through a bracket locking mechanism 20; a trademark anti-scratch transparent film 17 and a glass lens cover 18 are set up at main case 4 above back case 10; an armband buckle 12 is fixed to the rear of back case 10 through a second armband fixing clip 13 and a first arm band fixing clip 15; a fabric band 14 is set up at the end of armband buckle 12; and a waterproof earphone plug 11 and a waterproof acoustic transmission film 19 are set up from left to right of the bottom of upper cover 1.

A manufacturing method of the multi-functional mobile phone protection case includes the following steps:
1) Perform injection molding of upper cover 1 and main case 4 first;
2) Perform injection molding of rubber coatings of volume keys 9 and power key 5 after injection molding of upper cover 1 and main case 4 is completed;
3) Past fingerprint identification waterproof transparent film 7;
4) Manually insert main case 4 into slide block 22 of a rubber coating mold, wherein an oil cylinder 21 of slide block 22 quickly closes the mold of slide block 22 with main case 4;
5) Close front mold panel 23 and rear mold auxiliary panel 24, then a mold injection machine starts to work, and fills rubber into a product via a rubber inlet 25;
6) After the product injection molding is completed, open the mold, peel off a three-plate mold head, wherein plate A 27 and plate B 28 open; then, oil cylinder 21 of slide block 22 pulls slide block 22 away while a rear mold locating insert 27 blocks the product; after slide block 22 is separated from the product, rear mold locating insert 27 moves back; slide block 22 opens completely; at this time, the product is pushed upward along a slide block guide slot 26 of slide block 22; the product is taken out at last;
7) Perform injection molding and processing of other parts and accessories; and,
8) Assemble all parts to obtain the product.

The screen rubber coating 6 is fixed to main case 4 by using a screen sheet and then injection molded. The glass lens cover 18 on the back of main case 4 is made by waterproof glass. The LOGO display portion uses a mobile phone trademark anti-scratch parent film 17; back case 10 on the opposite side is detachable, and if not detached, the back case can connect to external mechanisms to achieve multiple functions.

When the multi-functional mobile case is in use, open padlock 3 along the arrow direction; then, pulled locking button 2 and then the locking mechanism opens to open the upper cover of the mobile phone case. When need to place the mobile phone tilted on a desk surface, open back case 10; open bracket locking mechanism 20 first; then, pull back case 10 to the desired angle, and place the mobile phone on the desk. When using earphone, manually unscrew waterproof earphone plug 11, waterproof earphone plug 11 is connected to main case 4 through soft PP; waterproof earphone plug 11 locks and seals threads through a sealing ring. The rubber coating of screen rubber coating 6, volume keys 9 and power key 5 are physically bonded through injection molding and melting of the main PC material and TPE material to achieve firm seal, thereby implement reliable waterproof of the product.

Through unique structure and manufacturing process design, the present invention can achieve integration of multiple functions, simple and sensible structure design. It not only features waterproof, collision proof and anti-freezing functions, but also adaption of different types of sports, portability and multi-style compatibility. It can be adapted to different types of mobile phone supports, and has a broad market prospect.

Certain terminology is used herein for purposes of reference only, and thus is not intended to be limiting. For example, terms such as "upper," "lower," "above", and "below" refer to directions in the drawings to which reference is made. Terms such as "front," "back," "rear," "bottom," "right," "left," and "side," describe the orientation of portions of the component within a consistent but arbitrary frame of reference which is made clear by reference to the text and the associated drawings describing the component under discussion. Such frame of reference may include the orientation by which a user views a mobile device. Such terminology may include the words specifically mentioned above, derivatives thereof, and words of similar import.

The above is a preferable embodiment of the present invention, but the present invention is not limited to the above embodiment. Those ordinarily skilled in this field can make various modifications within the principle of the present invention.

What is claimed is:

1. A multi-functional mobile phone protection case, comprising:
   an upper cover, a main case, a screen rubber coating and a back case, wherein the upper cover is installed on top of the main case through pins;
   a fingerprint identification waterproof transparent film is installed at the interior of the screen rubber coating;
   volume keys are set up on upper left side of the main case;
   a mobile phone fixing pad and a mobile phone rope are set up on the lower left side of the main case;
   a power key, a padlock and a locking button are set up from top to bottom of the left side of the main case;
   the back case is installed on the rear side of the main case through a bracket locking mechanism;
   a trademark anti-scratch transparent film and a glass lens cover are set up on the main case above the back case;
   an arm band buckle is fixed in the rear of the back case through a second arm band fixing clip and a first arm band fixing clip;
   a fabric band is provided at the end of the arm band buckle; and
   a waterproof earphone plug and a waterproof acoustic transmission film are provided from left to right of the bottom of the upper cover.

2. The multi-functional mobile phone protection case of claim 1, wherein the threads of the waterproof earphone plug lock a seal through a sealing ring.

3. A manufacturing method of the multi-functional mobile phone protection case, comprising the following steps:
- perform injection molding of the upper cover and the main case first;
- perform injection molding of the rubber coatings of the volume keys and the power key after the injection molding of the upper cover and the main case is completed;
- past the fingerprint identification waterproof transparent film;
- manually insert the main case into a sliding block of a rubber coating mold, wherein the oil cylinder of the slide block quickly closes the mold of the slide block with the main case;
- close a front mold panel and a rear mold auxiliary panel, then the mold injection machine starting to work, and fill rubber into the product via a rubber inlet;
- after the product injection molding is completed, open the mold, peel off the three-plate mold head, wherein plate A and plate B open;
- the oil cylinder of the slide block pulls the slide block away while a rear mold locating insert blocks the product;
- after the slide block is separated from the product, the rear mold locating insert moves back;
- the slide block opens completely;
- the product is pushed upward along a slide block guide slot of the slide block;
- the product is taken out;
- perform injection molding and processing of other parts and accessories; and
- assemble all parts to obtain the product.

4. A manufacturing method of the multi-functional mobile phone protection case of claim 3, wherein a flow plate is disposed between the front mold panel and the plate A.

* * * * *